US009976849B2

(12) United States Patent
Trail (10) Patent No.: US 9,976,849 B2
(45) Date of Patent: May 22, 2018

(54) DEPTH MAPPING USING STRUCTURED LIGHT AND TIME OF FLIGHT

(71) Applicant: Oculus VR, LLC, Menlo Park, CA (US)

(72) Inventor: Nicholas Daniel Trail, Bothell, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days. days.

(21) Appl. No.: 15/803,328

(22) Filed: Nov. 3, 2017

(65) Prior Publication Data

US 2018/0058844 A1    Mar. 1, 2018

Related U.S. Application Data

(63) Continuation of application No. 15/268,325, filed on Sep. 16, 2016, now Pat. No. 9,858,672.
(Continued)

(51) Int. Cl.
*G01B 11/25* (2006.01)
*G01S 17/32* (2006.01)
(Continued)

(52) U.S. Cl.
CPC ............ *G01B 11/2513* (2013.01); *G01C 3/08* (2013.01); *G01S 17/32* (2013.01); *G06T 7/30* (2017.01);
(Continued)

(58) Field of Classification Search
CPC .............................. G01B 11/2513; G06T 7/30
(Continued)

(56) References Cited

U.S. PATENT DOCUMENTS 8,150,142 B2 *  4/2012  Freedman .......... G01B 11/2513
                                                345/419
8,427,426 B2 *  4/2013  Corson ................. G06F 3/0346
                                                345/157
(Continued)

FOREIGN PATENT DOCUMENTS

JP           3298081 B2     7/2002
JP        2014-219621 A    11/2014
(Continued)

OTHER PUBLICATIONS

PCT International Search Report and Written Opinion, PCT Application No. PCT/US2017/012346, dated Mar. 30, 2017, 13 pages.
(Continued)

*Primary Examiner* — Roy M Punnoose
(74) *Attorney, Agent, or Firm* — Fenwick & West LLP (57) ABSTRACT

A depth camera assembly (DCA) determines distances between the DCA and objects in a local area within a field of view of the DCA. The DCA includes an illumination source that projects a known spatial pattern modulated with a temporal carrier signal into the local area. An imaging device capture the modulated pattern projected into the local area. The imaging device includes a detector that comprises different pixel groups that are each activated to captured light at different times. Hence, different pixel groups capture different phases of the temporally modulated pattern from the local area. The DCA determines times for light from the illumination source to be reflected and captured by the imaging device from the phases captured by the different pixel groups and also determines distances between the DCA and objects in the local area based on deformation of the spatial pattern captured by the imaging device.

20 Claims, 7 Drawing Sheets

Related U.S. Application Data (60) Provisional application No. 62/279,629, filed on Jan. 15, 2016.

(51) Int. Cl.
*G01C 3/08* (2006.01)
*G06T 7/35* (2017.01)
*G06T 7/30* (2017.01)
*G06T 19/00* (2011.01)

(52) U.S. Cl.
CPC .............. *G06T 7/35* (2017.01); *G06T 19/006* (2013.01); *G06T 2207/10028* (2013.01)

(58) Field of Classification Search
USPC ................................................ 356/614, 622
See application file for complete search history.

(56) References Cited

U.S. PATENT DOCUMENTS

| | | | |
|---|---|---|---|
| 9,712,806 B2* | 7/2017 | Olmstead | H04N 13/0239 |
| 9,858,672 B2* | 1/2018 | Trail | G06T 7/529 |
| 2006/0210111 A1 | 9/2006 | Cleveland et al. | |
| 2007/0183293 A1 | 8/2007 | Murata et al. | |
| 2009/0103777 A1 | 4/2009 | Hassebrook et al. | |
| 2009/0169095 A1 | 7/2009 | Zhuang et al. | |
| 2013/0050070 A1 | 2/2013 | Lewis et al. | |
| 2013/0176533 A1 | 7/2013 | Raffle et al. | |
| 2014/0153102 A1* | 6/2014 | Chang | G02B 27/0172 |
| | | | 359/630 |
| 2015/0062558 A1* | 3/2015 | Koppal | G01S 17/89 |
| | | | 356/5.01 |
| 2015/0070472 A1* | 3/2015 | Chen | G01B 11/2531 |
| | | | 348/47 |
| 2015/0102981 A1 | 4/2015 | Lee et al. | |
| 2015/0176982 A1 | 6/2015 | Gupta et al. | |
| 2015/0181096 A1 | 6/2015 | Kasai et al. | |
| 2015/0212326 A1 | 7/2015 | Kress et al. | |
| 2015/0286340 A1* | 10/2015 | Send | G01S 17/46 |
| | | | 345/175 |
| 2016/0005179 A1* | 1/2016 | Petyushko | G06T 5/50 |
| | | | 382/154 |
| 2016/0253812 A1* | 9/2016 | Grossinger | G01B 11/14 |
| | | | 356/614 |
| 2017/0160798 A1 | 6/2017 | Lanman et al. | |

FOREIGN PATENT DOCUMENTS

| | | |
|---|---|---|
| KR | 10-2013-0011692 A | 1/2013 |
| KR | 10-2014-0144510 A | 12/2014 |

OTHER PUBLICATIONS

PCT International Search Report and Written Opinion, PCT Application No. PCT/US2016/059938, dated Dec. 20, 2016, 12 pages.
PCT International Search Report and Written Opinion, PCT Application No. PCT/US2016/017397, dated Aug. 16, 2016, 21 pages.
U.S. Appl. No. 15/407,701, filed Jan. 17, 2017, Inventors Nicholas Daniel Trail et al.
U.S. Appl. No. 15/366,412, filed Dec. 1, 2016, Inventor Nicholas Daniel Trail.
Machine translation of JP 2014-219621, published Nov. 20, 2014, 15 pages.

* cited by examiner

DEPTH MAPPING USING STRUCTURED LIGHT AND TIME OF FLIGHT

This application is a continuation of co-pending U.S. application Ser. No. 15/268,325, filed Sep. 16, 2016, which claims the benefit of U.S. Provisional Application No. 62/279,629, filed Jan. 15, 2016, which is incorporated by reference in its entirety.

BACKGROUND

The present disclosure generally relates to virtual or augmented reality systems and more specifically relates to headsets for virtual reality systems that obtain depth information of a local area.

Virtual reality (VR) systems, or augmented reality (AR) systems, can leverage the capture of the environment surrounding a user in three dimensions (3D). However, traditional depth camera imaging architectures are comparably large in size, heavy, and consume significant amounts of power. Example common depth camera imaging architectures for obtaining 3D information of a scene include: time-of-flight (both direct-detect pulses and encoded waveforms), structured light (SL), and stereo vision. Different depth camera imaging architectures provide different strengths and weaknesses, so certain depth camera imaging architectures may provide better performance than others in different operating conditions. For instance, stereo vision architectures operate well with ambient illumination, while time-of-flight architectures having an active illumination source may be impaired by limitations in signal-to-noise ratio from ambient illumination. However, because of the relatively large size of conventional depth camera imaging architectures, many systems including a depth camera typically use a single type of depth camera imaging architecture configured for a particular use case. As head-mounted systems are increasingly used to perform a broader range of functions in varied operating conditions and environments, selecting a single depth camera imaging architecture to obtain depth information of an area surrounding the head-mounted system and user may impair the user experience with head-mounted systems.

SUMMARY

A headset in a virtual reality (VR) or augmented reality (AR) system environment includes a depth camera assembly (DCA) configured to determine distances between the headset and one or more objects in an area surrounding the headset and within a field of view of an imaging device included in the headset (i.e., a "local area"). The DCA includes the imaging device, such as a camera, and an illumination source that is configured to emit a specified pattern, such as a symmetric or quasi-random dots, grid, or horizontal bars, onto a scene. For example, the illumination source emits a grid or a series of horizontal bars onto the local area. Based on deformation of the pattern when projected onto surfaces in the local area, the DCA can leverage triangulation to determine distances between the surfaces and the headset.

In addition to controlling the specified pattern emitted onto the local area, the DCA also embeds a time-varying intensity to the pattern. Capturing information describing net round-trip times for light emitted from the illumination source to be reflected from objects in the local area back to the imaging device ("time of flight information"), the DCA has an additional mechanism for capturing depth information of the local area of the headset. Based on the times for the emitted light to be captured by the imaging device, the DCA determines distances between the DCA and objects in the local area reflecting the light from the illumination source. For example, the DCA determines a foot of distance between the DCA and an object in the local area per approximately two (2) nanoseconds for emitted light to be captured by the imaging device included in the DCA. To capture time of flight information as well as structured light information, the illumination source modulates the temporal and spatial intensity of the pattern emitted by the illumination source with a temporal carrier signal having a specific frequency, such as 30 megahertz.

The imaging device captures light from the local area, including light emitted by the illumination source, which is prescribed by a spatial and a temporal profile. To determine time of flight information from the illumination source reflected by objects in the local area, the imaging device includes a detector comprising an array of pixel groups. Each pixel group may include one or more pixels, and different pixel groups are associated with different phase shifts in integration time relative to a phase of the carrier signal used by the illumination source to modulate the emitted pattern. Different pixel groups in the detector receive different control signals, so the different pixel groups capture light at different times specified by the control signal. This allows different pixel groups in the detector to capture different phases of the modulated pattern. For example, four pixel groups nearest to each other receive different control signals that cause each of the four pixel groups to capture light at different times, so light captured by each of the four pixel groups has a ninety (90) degree phase shift relative to light captured by other pixel groups in the four pixel groups. The DCA compares the relative signal between the four pixel groups to derive a net phase or angle of the carrier signal for an object position, which will vary across the detector based upon relative field of view. The derived net phase or angle is based on signal differences of the light captured by different pixel groups in the detector. Using any suitable technique, the DCA compensates for temporal offsets in the relative signal to determine an image of the structured pattern emitted onto the local area. For example, the DCA compensates for temporal offsets in the relative signal by inverting a phase angle of the relative signal to scale the relative pixel-by-pixel irradiance, summing relative signals from neighboring pixels to remove temporal bias, or perform other suitable operations based on temporal offsets of the relative signal and offsets in the derived net phase or angle from different pixels in the detector. Accordingly, a frame captured by the imaging device in the DCA captures structured light (i.e., spatial) data and time-of-flight (i.e. temporal) data, improving overall estimation of depth information for the local area by the DCA. As structured light data and time-of-flight data provide different information for relative depth of the local area relative to the DCA, capturing structured light data and time-of-flight data in a frame improves accuracy, precision, and robustness of depth estimation by the DCA. Capturing structured light and time-of-flight data in a single frame also decreases the DCA's sensitivity to movement or motion variance, allowing the DCA to leverage relative strengths of both time-of-flight data and structured-light data using a single detector, providing a smaller, lighter and more cost effective DCA implementation.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
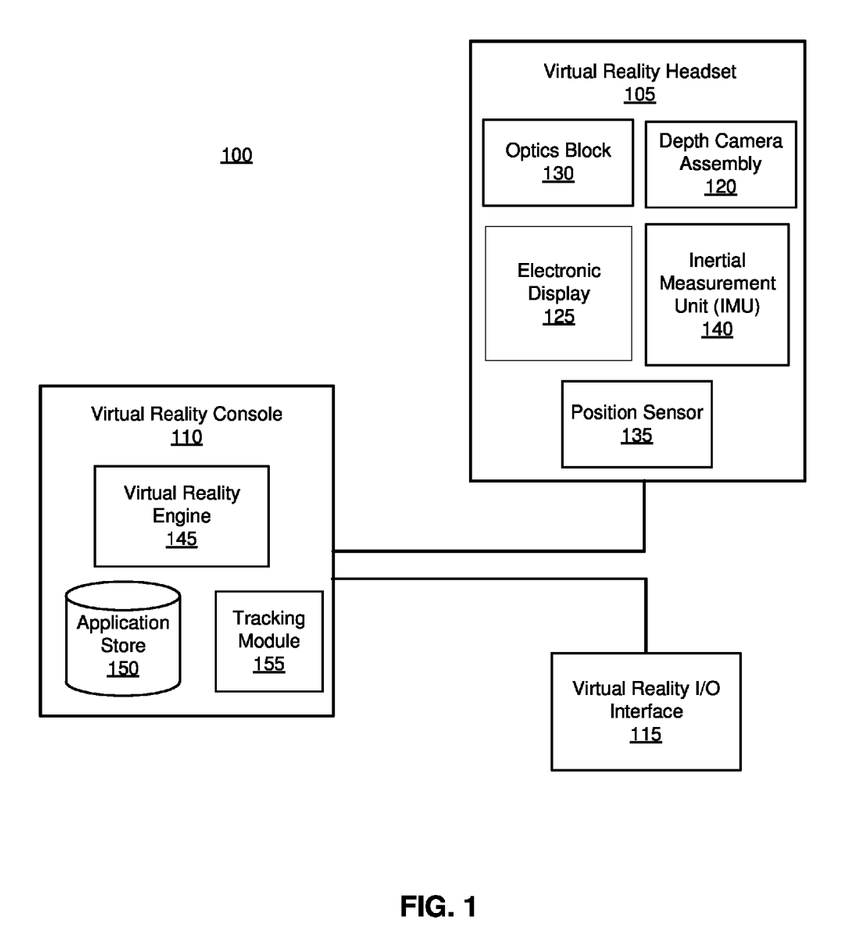
FIG. 1 is a block diagram of a system environment including a virtual reality system, in accordance with an embodiment.

FIG. 1 is a block diagram of one embodiment of a virtual reality (VR) system environment 100 in which a VR console 110 operates. While FIG. 1 shows a VR system environment for purposes of illustration, the components and functionality described herein may also be included in an augmented reality (AR) system in various embodiments. As used herein, a VR system environment 100 may also include virtual reality system environments that present users with virtual environments with which the user may interact. The VR system environment 100 shown by FIG. 1 comprises a VR headset 105 and a VR input/output (I/O) interface 115 that is coupled to a VR console 110. While FIG. 1 shows an example system 100 including one VR headset 105 and one VR I/O interface 115, in other embodiments any number of these components may be included in the VR system environment 100. For example, there may be multiple VR headsets 105 each having an associated VR I/O interface 115, with each VR headset 105 and VR I/O interface 115 communicating with the VR console 110. In alternative configurations, different and/or additional components may be included in the VR system environment 100. Additionally, functionality described in conjunction with one or more of the components shown in FIG. 1 may be distributed among the components in a different manner than described in conjunction with FIG. 1 in some embodiments. For example, some or all of the functionality of the VR console 110 is provided by the VR headset 105.

The VR headset 105 is a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2 and 3. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes a depth camera assembly (DCA) 120, an electronic display 125, an optics block 130, one or more position sensors 135, and an inertial measurement Unit (IMU) 140. Some embodiments of The VR headset 105 have different components than those described in conjunction with FIG. 1. Additionally, the functionality provided by various components described in conjunction with FIG. 1 may be differently distributed among the components of the VR headset 105 in other embodiments.

The DCA 120 captures data describing depth information of an area surrounding the VR headset 105. Some embodiments of the DCA 120 include one or more imaging devices (e.g., a camera, a video camera) and an illumination source configured to emit a structured light (SL) pattern. As further discussed below, structured light projects a specified pattern, such as a symmetric or quasi-random dot pattern, grid, or horizontal bars, onto a scene. For example, the illumination source emits a grid or a series of horizontal bars onto an environment surrounding the VR headset 105. Based on triangulation, or perceived deformation of the pattern when projected onto surfaces, depth and surface information of objects within the scene is determined.

To better capture depth information of the area surrounding the VR headset 105 the DCA 120 also captures time of flight information describing times for light emitted from the illumination source to be reflected from objects in the area surrounding the VR headset 105 back to the one or more imaging devices. In various implementations, the DCA 120 captures time-of-flight information simultaneously or near-simultaneously with structured light information. Based on the times for the emitted light to be captured by one or more imaging devices, the DCA 120 determines distances between the DCA 120 and objects in the area surrounding the VR headset 105 that reflect light from the illumination source. To capture time of flight information as well as structured light information, the illumination source modulates the emitted SL pattern with a carrier signal having a specific frequency, such as 30 MHz (in various embodiments, the frequency may be selected from a range of frequencies between 5 MHz and 5 GHz).

The imaging devices capture and record particular ranges of wavelengths of light (i.e., "bands" of light). Example bands of light captured by an imaging device include: a visible band (~380 nm to 750 nm), an infrared (IR) band (~750 nm to 2,200 nm), an ultraviolet band (100 nm to 380 nm), another portion of the electromagnetic spectrum, or some combination thereof. In some embodiments, an imaging device captures images including light in the visible band and in the infrared band. To jointly capture light from the structured light pattern that is reflected from objects in the area surrounding the VR headset 105 and determine times for the carrier signal from the illumination source to be reflected from objects in the area to the DCA 120, the imaging device includes a detector comprising an array of pixel groups. Each pixel group includes one or more pixels, and different pixel groups are associated with different phase shifts relative to a phase of the carrier signal. In various embodiments, different pixel groups are activated at different times relative to each other to capture different temporal phases of the pattern modulated by the carrier signal emitted by the illumination source. For example, pixel groups are activated at different times so that adjacent pixel groups capture light having approximately a 90, 180, or 270 degree phase shift relative to each other. The DCA 120 derives a phase of the carrier signal, which is equated to a depth from the DCA 120, from signal data captured by the different pixel groups. The captured data also generates an image frame of the spatial pattern, either through summation of the total pixel charges across the time domain, or after correct for the carrier phase signal. The DCA 120 is further described below in conjunction with FIGS. 3-4D.

The electronic display 125 displays 2D or 3D images to the user in accordance with data received from the VR console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an active-matrix organic light-emitting diode display (AMOLED), some other display, or some combination thereof.

The optics block 130 magnifies image light received from the electronic display 125, corrects optical errors associated with the image light, and presents the corrected image light to a user of the VR headset 105. In various embodiments, the optics block 130 includes one or more optical elements. Example optical elements included in the optics block 130 include: an aperture, a Fresnel lens, a convex lens, a concave lens, a filter, a reflecting surface, or any other suitable optical element that affects image light. Moreover, the optics block 130 may include combinations of different optical elements. In some embodiments, one or more of the optical elements in the optics block 130 may have one or more coatings, such as anti-reflective coatings.

Magnification and focusing of the image light by the optics block 130 allows the electronic display 125 to be physically smaller, weigh less and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel distortions, pincushion distortions, longitudinal chromatic aberrations, or transverse chromatic aberrations. Other types of optical errors may further include spherical aberrations, comatic aberrations or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the VR headset 105 based on measurement signals received from one or more of the position sensors 135 and from depth information received from the DCA 120. A position sensor 135 generates one or more measurement signals in response to motion of the VR headset 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the VR headset 105 relative to an initial position of the VR headset 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the VR headset 105 from the sampled data. For example, the IMU 140 integrates the measurement signals received from the accelerometers over time to estimate a velocity vector and integrates the velocity vector over time to determine an estimated current position of a reference point on the VR headset 105. Alternatively, the IMU 140 provides the sampled measurement signals to the VR console 110, which interprets the data to reduce error. The reference point is a point that may be used to describe the position of the VR headset 105. The reference point may generally be defined as a point in space or a position related to the VR headset's 105 orientation and position.

The IMU 140 receives one or more parameters from the VR console 110. As further discussed below, the one or more parameters are used to maintain tracking of the VR headset 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the VR headset 105, the IMU 140 may be a dedicated hardware component. In other embodiments, the IMU 140 may be a software component implemented in one or more processors.

The VR I/O interface 115 is a device that allows a user to send action requests and receive responses from the VR console 110. An action request is a request to perform a particular action. For example, an action request may be an instruction to start or end capture of image or video data or an instruction to perform a particular action within an application. The VR I/O interface 115 may include one or more input devices. Example input devices include: a keyboard, a mouse, a game controller, or any other suitable device for receiving action requests and communicating the action requests to the VR console 110. An action request received by the VR I/O interface 115 is communicated to the VR console 110, which performs an action corresponding to the action request. In some embodiments, the VR I/O interface 115 includes an IMU 140, as further described above, that captures calibration data indicating an estimated position of the VR I/O interface 115 relative to an initial position of the VR I/O interface 115. In some embodiments, the VR I/O interface 115 may provide haptic feedback to the user in accordance with instructions received from the VR console 110. For example, haptic feedback is provided when an action request is received, or the VR console 110 communicates instructions to the VR I/O interface 115 causing the VR I/O interface 115 to generate haptic feedback when the VR console 110 performs an action.

The VR console 110 provides content to the VR headset 105 for processing in accordance with information received from one or more of: the DCA 120, the VR headset 105, and the VR I/O interface 115. In the example shown in FIG. 1, the VR console 110 includes an application store 150, a tracking module 155 and a VR engine 145. Some embodiments of the VR console 110 have different modules or components than those described in conjunction with FIG. 1. Similarly, the functions further described below may be distributed among components of the VR console 110 in a different manner than described in conjunction with FIG. 1.

The application store 150 stores one or more applications for execution by the VR console 110. An application is a group of instructions, that when executed by a processor, generates content for presentation to the user. Content generated by an application may be in response to inputs received from the user via movement of the VR headset 105 or the VR I/O interface 115. Examples of applications include: gaming applications, conferencing applications, video playback applications, or other suitable applications.

The tracking module 155 calibrates the VR system environment 100 using one or more calibration parameters and may adjust one or more calibration parameters to reduce error in determination of the position of the VR headset 105 or of the VR I/O interface 115. For example, the tracking module 155 communicates a calibration parameter to the DCA 120 to adjust the focus of the DCA 120 to more accurately determine positions of SL elements captured by the DCA 120. Calibration performed by the tracking module 155 also accounts for information received from the IMU 140 in the VR headset 105 and/or an IMU 140 included in the VR I/O interface 115. Additionally, if tracking of the VR headset 105 is lost (e.g., the DCA 120 loses line of sight of at least a threshold number of SL elements), the tracking module 140 may re-calibrate some or all of the VR system environment 100.

The tracking module 155 tracks movements of the VR headset 105 or of the VR I/O interface 115 using information from the DCA 120, the one or more position sensors 135, the IMU 140 or some combination thereof. For example, the tracking module 155 determines a position of a reference point of the VR headset 105 in a mapping of a local area based on information from the VR headset 105. The tracking module 155 may also determine positions of the reference point of the VR headset 105 or a reference point of the VR I/O interface 115 using data indicating a position of the VR headset 105 from the IMU 140 or using data indicating a position of the VR I/O interface 115 from an IMU 140 included in the VR I/O interface 115, respectively. Additionally, in some embodiments, the tracking module 155 may use portions of data indicating a position of the VR headset 105 from the IMU 140 as well as representations of the local area from the DCA 120 to predict a future location of the VR headset 105. The tracking module 155 provides the estimated or predicted future position of the VR headset 105 or the VR I/O interface 115 to the VR engine 145.

The VR engine 145 generates a 3D mapping of the area surrounding the VR headset 105 (i.e., the "local area") based on information received from the VR headset 105. In some embodiments, the VR engine 145 determines depth information for the 3D mapping of the local area based on images of deformed SL elements captured by the DCA 120 of the VR headset 105, based on elapsed times for light emitted by the DCA 120 to be detected by the DCA 120 after being reflected by one or more objects in the area surrounding the VR headset 105, or based on a combination of images of deformed SL elements captured by the DCA 120 and elapsed times for light emitted by the DCA 120 to be detected by the DCA 120 after being reflected by one or more objects in the area surrounding the VR headset 105. In various embodiments, the VR engine 145 uses different types of information determined by the DCA 120 or a combination of types of information determined by the DCA 120.

The VR engine 145 also executes applications within the VR system environment 100 and receives position information, acceleration information, velocity information, predicted future positions, or some combination thereof, of the VR headset 105 from the tracking module 155. Based on the received information, the VR engine 145 determines content to provide to the VR headset 105 for presentation to the user. For example, if the received information indicates that the user has looked to the left, the VR engine 145 generates content for the VR headset 105 that mirrors the user's movement in a virtual environment or in an environment augmenting the local area with additional content. Additionally, the VR engine 145 performs an action within an application executing on the VR console 110 in response to an action request received from the VR I/O interface 115 and provides feedback to the user that the action was performed. The provided feedback may be visual or audible feedback via the VR headset 105 or haptic feedback via the VR I/O interface 115.

Figure 2:
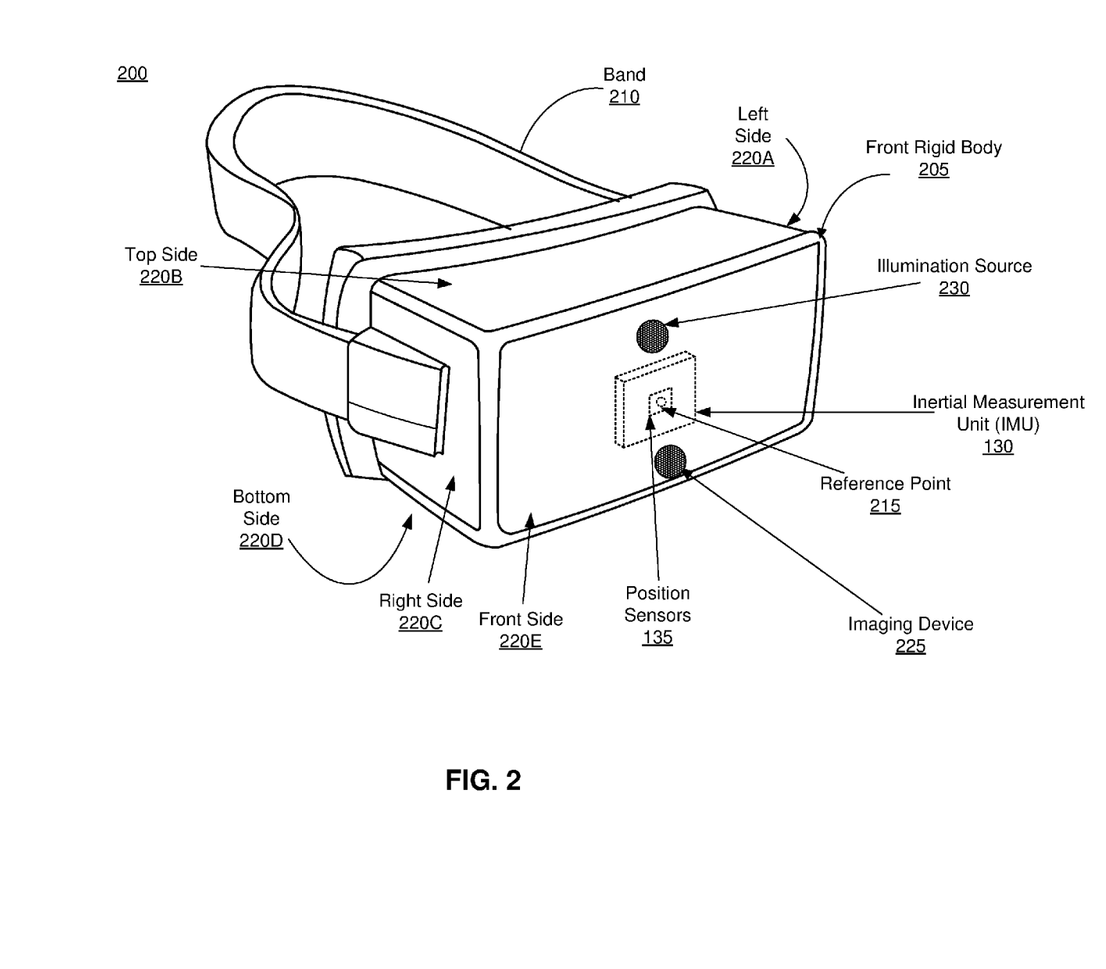
FIG. 2 is a diagram of a virtual reality headset, in accordance with an embodiment.

FIG. 2 is a wire diagram of one embodiment of a VR headset 200. The VR headset 200 is an embodiment of the VR headset 105, and includes a front rigid body 205, a band 210, a reference point 215, a left side 220A, a top side 220B, a right side 220C, a bottom side 220D, and a front side 220E. The VR headset 200 shown in FIG. 2 also includes an embodiment of a depth camera assembly (DCA) 120 including a camera, 225 and a illumination source 230, which are further described below in conjunction with FIGS. 3 and 4. The front rigid body 205 includes one or more electronic display elements of the electronic display 125 (not shown), the IMU 130, the one or more position sensors 135, and the reference point 215.

In the embodiment shown by FIG. 2, the VR headset 200 includes a DCA 120 comprising a camera 225 and an illumination source 230 configured to project a known spatial pattern (e.g., a grid, a series of lines, a pattern of symmetrical or quasi-randomly oriented dots) onto the local area. For example, the spatial pattern comprises one or more geometrical elements of known width and height, allowing calculation of deformation of various geometrical elements when the spatial pattern is projected onto the local area to provide information about the objects in the local area. The illumination source 230 temporally modulates the known spatial pattern with a carrier signal having a specified frequency. In various embodiments, the illumination source 230 includes a controller (e.g., a processor) coupled to the light emitter, with the controller configured to modulate light emitted by the light emitter by a carrier signal to vary intensity of the light emitted by the light emitter over time based on variation of the carrier signal. When the light emitter emits a known spatial pattern (i.e., a "pattern of structured light" or a "structured light pattern"), the intensity of the known spatial pattern varies over time based on the carrier signal. For example, the illumination source 230 includes a light emitter coupled to a controller that modulates a known spatial pattern with a sine wave having a frequency of 10 MHz, with a square wave having a frequency of 100 MHz, or with any other suitable signal. The camera 225 captures images of the local area, which are used to calculate a depth image of the local area, as further described below in conjunction with FIGS. 3-4B.

Figure 3:
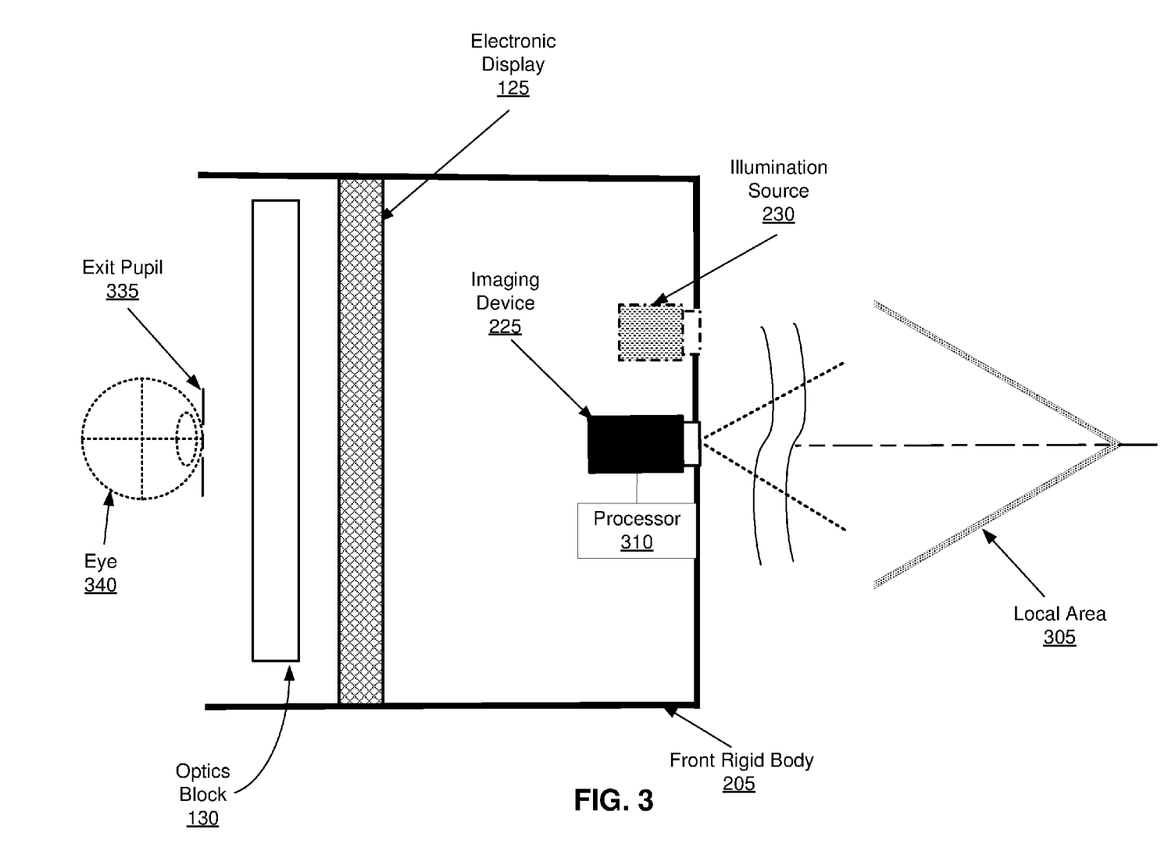
FIG. 3 is a cross section of a front rigid body of a virtual reality headset, in accordance with an embodiment.

FIG. 3 is a cross section of the front rigid body 205 of the VR headset 200 depicted in FIG. 2. As shown in FIG. 3, the front rigid body 205 includes an imaging device 225 and an illumination source 230. Also shown in the example of FIG. 3, the front rigid body 205 includes a processor 315 coupled to the imaging device 225. However, in other embodiments, the processor 315 is included in the imaging device 225. The front rigid body 205 also has an optical axis corresponding to a path along which light propagates through the front rigid body 205. In some embodiments, the imaging device 225 is positioned along the optical axis and captures images of a local area 305, which is a portion of an environment surrounding the front rigid body 205 within a field of view of the imaging device 225. Additionally, the front rigid body 205 includes the electronic display 125 and the optics block 130, which are further described above in conjunction with FIG. 1. The front rigid body 205 also includes an exit pupil 335 where the user's eye 340 is located. For purposes of illustration, FIG. 3 shows a cross section of the front rigid body 205 in accordance with a single eye 340. The local area 305 reflects incident ambient light as well as light projected by the illumination source 230.

As described above in conjunction with FIG. 1, the electronic display 125 emits light forming an image toward the optics block 130, which alters the light received from the electronic display 125. The optics block 130 directs the altered image light to the exit pupil 335, which is a location of the front rigid body 205 where a user's eye 340 is positioned. FIG. 3 shows a cross section of the front rigid body 205 for a single eye 340 of the user, with another electronic display 125 and optics block 130, separate from those shown in FIG. 3, included in the front rigid body 205 to present content, such as an augmented representation of the local area 305 or virtual content, to another eye of the user.

The depth camera assembly (DCA) 120 including the illumination source 230 and the imaging device 225 captures information describing times for light emitted from the illumination source 230 to be reflected from objects in the local area 305 back to the imaging device 225 as well as images of a structured light pattern projected onto to local area 305 by the illumination source 230 using a detector. In various embodiments, the detector is included in the imaging device 225. As described above, to capture the times for light from the illumination source 230 to be reflected from objects in the local area 305, the illumination source 230 modulates a structured light pattern with a carrier signal having a specified frequency. For example, the illumination source 230 modulates the structured light pattern with a 10 MHz sine wave, causing the light emitted by the illumination source 230 to vary in intensity over time based on the carrier signal.

Figure 4A:
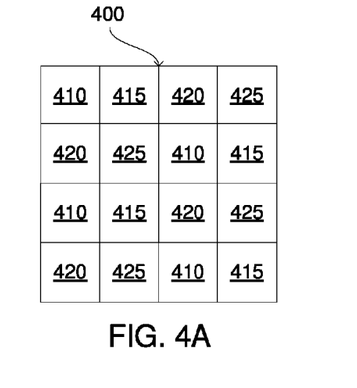
FIG. 4A is an example of a detector included in an imaging device of a depth camera assembly included in a virtual reality headset, in accordance with an embodiment.

To capture both the spatial and temporal modulated light pattern, the imaging device 225 includes a detector comprising multiple groups of pixels. FIG. 4A shows an example detector 400 included in the imaging device 225. The detector 400 in FIG. 4A includes different pixel groups 410, 415, 420, 425 that each receive different control signals activating the pixel groups 410, 415, 420, 425 to capture image data. Having different pixel groups 410, 415, 420, 425 receive different control signals allows the different pixel groups 410, 415, 420, 425 to capture image data with offset, yet controlled, timing sequences. For example, when a control signal received by a pixel group 410, 415, 420, 425 has a particular value, the pixel group 410, 415, 420, 425 captures light from the local area 305, and when the control signal has an alternative value, the pixel group 410, 415, 420, 425 does not capture light from the local area 305. Pixel groups 410, 415, 420, 425 in the detector 400 are positioned relative to each other so that pixel groups 410, 415, 420, 425 nearest to each other capture light at different times, resulting in a specific phase shift between light captured by the pixel groups 410, 415, 420, 425 nearest to each other. In the example of FIG. 4A, pixel group 410, pixel group 415, pixel group 420, and pixel group 425 capture light at different times, so light captured by pixel group 410 has a 90 degree phase shift relative to light captured by pixel group 415, which has a 90 degree phase shift relative to pixel group 420 (and a 180 degree phase shift relative to pixel group 410). However, in other embodiments, light captured by a pixel group 410 has any suitable specific phase shift relative to light captured by other pixel groups 415, 420, 425 nearest to the pixel group 410 (e.g., a 45 degree phase shift, a 10 degree phase shift, etc.). Also in the example of FIG. 4, pixel group 425 has a 90 degree phase shift to pixel group 420 (and a 270 degree phase shift to pixel group 410). Similarly, each of pixel group 415, pixel group 420, and pixel group 425 capture light with a 90 degree phase shift relative to the other pixel groups 410, 415, 420, 425. For example, pixel group 410, pixel group 415, pixel group 420, and pixel group 425 capture light with a phase shift of 0 degrees, a phase shift of 90 degrees, a phase shift of 180 degrees, and a phase shift of 270 degrees, respectively. In various embodiments, pixel groups 410, 415, 420, 425 are arranged in the detector 400 in a repeating pattern. For example, the detector 400 includes multiple 2 by 2 grids each including pixel groups 410, 415, 420, 425 arranged relative to each other as shown in FIG. 4A.

The processor 310 coupled to the imaging device 225 (or included in the imaging device 225) receives data from the imaging device 225 and determines a phase of the carrier signal that temporally modulated pattern of structured light, as further described below. Based on the determined phase of the carrier signal, the processor 310 determines a time for the modulated pattern of structured light to be reflected by one or more objects in the local area and captured by the detector 400 of the imaging device 225. From the times determined for reflection of the pattern of structured light by different objects in the local area, the processor 310 determines distances from the detector 400 to one or more objects in the local area and generates a frame including the pattern of structured light from the light captured by each pixel group 410, 415, 420, 425 in the detector 400.

Figure 4B:
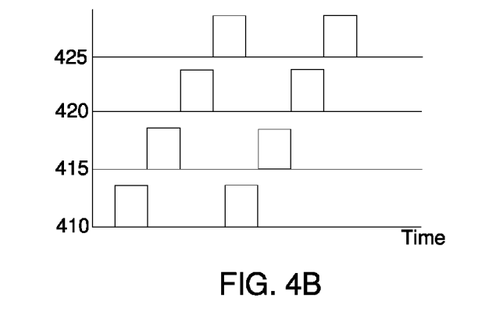
FIG. 4B is an example of control signals operating the example detector integration timing shown in FIG. 4A, in accordance with an embodiment.

FIG. 4B shows an example of control signals received by different pixel groups 410, 415, 420, and 425 in the detector 400. In the example of FIG. 4B, when a control signal has a maximum value, a pixel group 410, 415, 420, 425 receiving the control signal captures light, while pixel groups 410, 415, 420, 425 receiving different control signals do not capture light. Similarly, when the control signal has a minimum value, a pixel group 410, 415, 420, 425 receiving the control signal does not capture light. As shown by FIG. 4B, the control signals for different pixel groups 410, 415, 420, 425 have maximum values at different times, so a single pixel group 410, 415, 420, 425 captures light at a particular time. For example, when the control signal received by pixel group 415 has a maximum value, control signals received by pixel groups 410, 420, 425 have minimum values, so pixel groups 410, 420, 425 do not capture light while pixel group 415 captures light. Different pixel groups 410, 415, 420, 425 serially capture light based on their control signals. When light is captured from each pixel group 410, 415, 420, 425, the detector generates a frame. In various embodiments, light is captured from each pixel group 410, 415, 420, 425 multiple times, and the detector generates a frame from the accumulated light captured by the pixel groups 410, 415, 420, 425 to improve a signal-to-noise ratio of the frame. Capturing light from different pixel groups 410, 415, 420, 425 at different times is repeated for a subsequent frame, with an amount of time light is captured for a frame determined by an overall integration time for each frame and a frame rate of the imaging device 225.

Figure 4C:
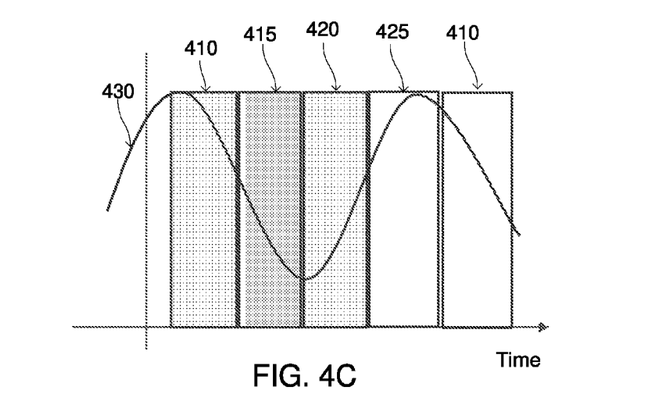
FIG. 4C is an example of capturing light by different pixel groups in the example detector shown in FIG. 4A for a sinusoidal carrier wave, in accordance with an embodiment.

Hence, in an embodiment, different pixel groups 410, 415, 420, 425 capture light from the local area 305 at different offset times, which are a fraction of a round-trip time of a frequency of the carrier signal modulating the spatial pattern. For example, FIG. 4C shows an example sinusoidal carrier signal 430 with which the illumination source 230 modulates the structured light pattern. FIG. 4C identifies the different pixel groups 410, 415, 420, 425 capturing light including the carrier signal 430 at different times. Hence, pixel group 410 captures light including a portion of the carrier signal 430 during times when the control signal received by the pixel group 410 has a maximum value, while pixel groups 415, 420, 425 do not capture light including portions of the carrier signal 430. The remaining pixel groups 415, 420, 425 similarly each capture portions of the carrier signal 430 during time intervals when control signals received by a corresponding pixel groups 415, 420, 425 have a maximum value. While FIG. 4C shows the carrier signal 430 as a sine wave, in other embodiments, the carrier signal 430 may be a square wave or any other signal having a combination of frequencies and harmonics. Hence, in the example of FIGS. 4A-4C, when pixel group 410 captures light, the remaining pixel groups 415, 420, 245 do not capture light, so when a single pixel group is capturing light, the remaining three pixel groups do not capture light for that relative frame. After each pixel group 410, 415, 420, 425 captures light for a single serial pattern, the sequence is repeated during the integration time for a frame captured by the imaging device 225.

Based on the intensity of light received by different pixel groups 410, 415, 420, 425 in the image capture device 320, the DCA 120 determines a phase of the carrier signal. For example, the DCA 120 determines a difference between light captured by pixel group 425 and light captured by pixel group 415. Additionally, the DCA 120 determines an additional difference between light captured by pixel group 410 and light captured by pixel group 420. In the example configuration of the detector 400 shown in FIG. 4A (which is a minimum quadrature arrangement), the DCA 120 determines the phase of the carrier signal as an arctangent of a ratio of the difference to the additional difference. Using the determined phase, the DCA 120 determines times from light emitted from the illumination source 230 to be reflected back to the imaging device 225 by objects in the local area 305. From the determined times, the DCA 120 determines distances between the DCA 120 and various objects in the local area 305 using one or more time-of-flight methods. Additionally, using the determined phase, the DCA 120 combines the light captured by different pixel groups 410, 415, 420, 425 into a frame that allows the structured light pattern emitted from the illumination source 310 to provide further depth information for the local area 305. Distances determined by the one or more time of flight methods provides distance information between objects in the local area 305 and the DCA 120, while analysis of the structured light pattern captured by the imaging device 225 provides a related but unique distance measurement between objects in the local area 305 and the DCA 120.

Figure 4D:
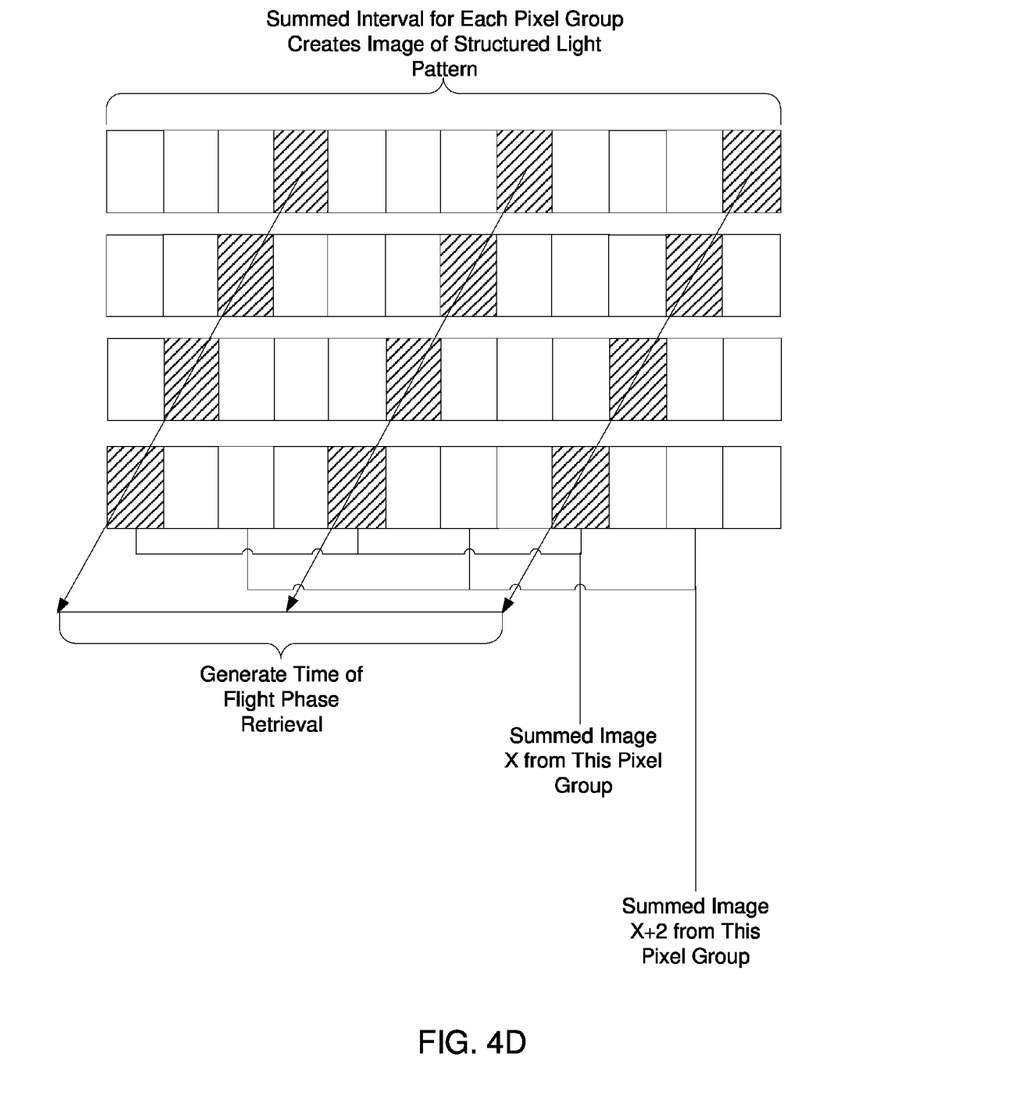
FIG. 4D is another example of a detector included in an imaging device of a depth camera assembly included in a virtual reality headset, in accordance with an embodiment.

FIG. 4D shows another example of a detector 405 included in an imaging device of a depth camera assembly 120. In the detector 400 described in conjunction with FIGS. 4A-4C, different pixel groups 410, 415, 420, 425 in the detector 400 are illustrated to capture light for fractions of an integration time for the imaging device 225 to generate a frame. In the example of FIG. 4D, each pixel group 410, 415, 420, 425 of the detector 405 includes multiple charge storage regions per each pixel, which may be implemented via software or hardware, such as a circulator or a switch. This allows each pixel group 410, 415, 420, 425 to continuously capture light during an integration time, and dynamically vary the location to which current generated from captured light is coupled based on frequency and phase timing of the carrier signal 430. Charge accumulated from light captured by different pixel groups 410, 415, 420, 425 is accumulated in different locations (e.g., memory or capacitors), providing different sub-windows, shown as highlighted rectangles in FIG. 4D. As shown in FIG. 4D, sub-windows are combined along a diagonal to illustrate sub-windows having a 90 degree phase shift relative to each other. Sub-windows from each pixel group 410, 415, 420, 425, are combined in phase to increase the signal-to-noise ratio and to generate a frame for a time-of-flight measurement. Hence, light captured by different pixel groups 410, 415, 420, 425 at different times is combined via the previously discussed method to extract the phase of the carrier signal 430. In the example of FIG. 4D, the highlighted sub-windows within a specified maximum integration time are combined, as each pixel group 410, 415, 420, 425 continuously captures light and varies locations where charge from the captured light is accumulated at a phase of the carrier frequency. For example, each pixel group 410, 415, 420, 425 of the detector 405 of FIG. 4D simultaneously captures light and accumulates charge in a location corresponding to a pixel group 41, 415, 420, 425 capturing light, with the location in which charge accumulated by a pixel group 410, 415, 420, 425 changing based on the carrier signal 430 to preserve the phase of the carrier frequency. In some embodiments, each pixel group 410, 415, 420, 425 of the detector 405 shown in FIG. 4D is configured to capture light at up to a 100 percent duty cycle, allowing multiple pixel groups 410, 415, 420, 425 of the detector 405 to continuously and simultaneously accumulate charge from light captured by multiple pixel groups 410, 415, 420, 425 in some embodiments. As further described above, a phase angle determined by different pixel groups 410, 415, 420, 425 allows correction of radiometric differences to analyze the structured light pattern. Additionally, in the example of FIG. 4D, continuous capture of light by different pixel groups 410, 415, 420, 425 allows passive correction for a structured light image analysis. By summing the full charge captured over the full integration window for each pixel group 410, 415, 420, 425, the detector 405 operates as an image capture device, such as a camera, as there appears to be no offset in the pixel level integration timing. Hence, the detector 405 shown in FIG. 4D reduces the potential for correlated fixed pattern, temporal, or systemic noise by minimizing the effect of temporal modulation on the structured light algorithm.

Figure 5A:
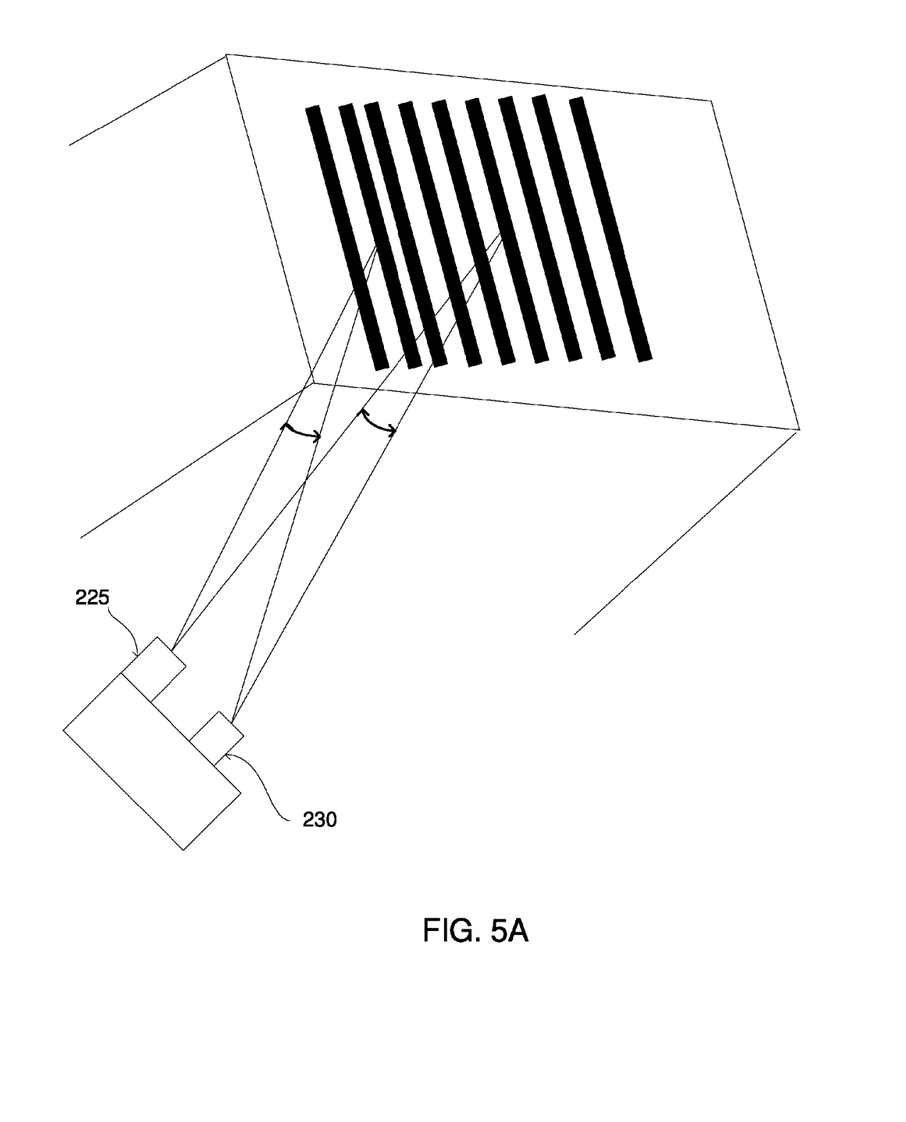
FIG. 5A shows an example arrangement of an imaging device and an illumination source projecting a structured light pattern onto a local area, in accordance with an embodiment.

FIG. 5A shows an example arrangement of an imaging device 225 and an illumination source 230 projecting a structured light pattern (also referred to as a spatial pattern)

onto a local area. In FIG. 5A, the example spatial pattern comprises vertical bars projected within a field of view of the illumination source 230. Through scattered or direct reflection the spatial pattern is captured by a detector in the imaging device 225, which through triangulation with the illumination source 230 allows structure light methods to extract the three-dimensional layout of the local area.

Figure 5B:
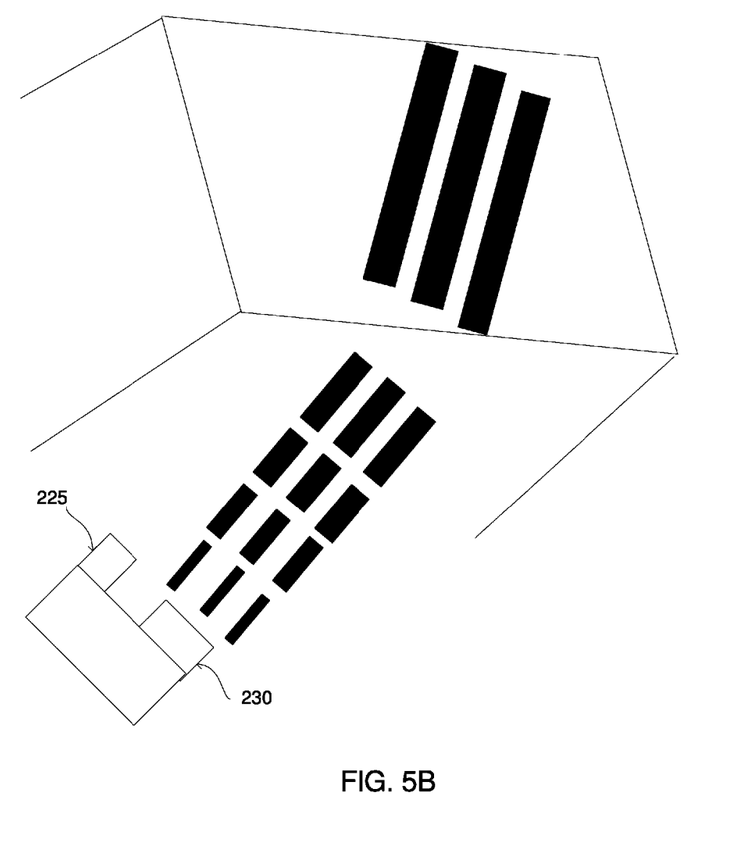
FIG. 5B shows an example arrangement of an imaging device and an illumination source projecting a structured light pattern that is both temporally and spatially modulated onto a local area, in accordance with an embodiment.

FIG. 5B shows an example arrangement of an imaging device 225 and an illumination source 230 projecting a structured light pattern (also referred to as a spatial pattern) from the illumination source 230 that is also temporally modulated. In FIG. 5B, temporal modulation is shown by rectangular regions at approximately equal distances from the illumination source 230 before reaching the local area. The spatial pattern is shown in FIG. 5B as four vertical bars for purposes of illustration. Hence, the imaging device 225 and the illumination source 230 in FIG. 5B allow capture of the spatial pattern and time-of-flight information to provide both spatial and temporal methods to extract the local area depth, respectively. As described above in conjunction with FIGS. 3-4D, the imaging device 225 includes a common detector to capture both spatial and temporal information by controlling phase offsets between different pixel groups 410, 415, 420, 425 in the imaging device 225.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. An apparatus comprising:
    a light emitter configured to emit a structured light pattern modulated by a carrier signal, wherein an intensity of the modulated structured light pattern varies over time based on the carrier signal;
    a detector configured to capture a portion of the modulated structured light pattern, the detector comprising a plurality of pixel groups, each pixel group configured to capture light at different times than other pixel groups; and
    a processor configured to:
        determine a phase of the carrier signal based on intensities of light received by different pixel groups in the detector,
        determine a time for the portion of the modulated pattern of structured light to be reflected from one or more objects in a local area and captured by the detector based on the determined phase of the carrier signal, and
        determine a distance from the detector to the one or more objects in the local area from the determined time.

2. The apparatus of claim 1, wherein the processor is further configured to
    generate a frame including the pattern of structured light from the light captured by each pixel group in the detector at the different times.

3. The apparatus of claim 1, wherein, a pixel group is configured to capture light when a control signal received by the pixel group has a value and to not capture light when the control signal received by the pixel group has an alternative value.

4. The apparatus of claim 3, wherein control signals received by different pixel groups have the value at the different times.

5. The apparatus of claim 3, wherein control signals received by adjacent pixel groups at the different times cause light captured by the pixel group to have a specific phase shift relative to light captured by other pixel groups adjacent to the pixel group.

6. The apparatus of claim 5, wherein the specific phase shift is a ninety-degree phase shift.

7. The apparatus of claim 6, wherein the control signal received by the pixel group has the value at a particular time and the control signals received by the other pixel groups have the alternative value at the particular time.

8. The apparatus of claim 6, wherein the control signal received by the pixel group has the value at a particular time and the control signals received by each pixel group adjacent to the pixel group have the alternative value at the particular time.

9. The apparatus of claim 6, wherein determine the phase of the carrier signal based on intensities of light received by different pixel groups in the detector comprises:
    determine a difference between intensities of light captured by the pixel group and by another pixel group adjacent to the pixel group;
    determine an additional difference between intensities of light captured by an alternative pixel group and a further pixel group adjacent to the alternative pixel group, the alternative pixel group and the further pixel group adjacent to the pixel group; and
    determine the phase of the carrier signal based on a ratio of the difference to the additional difference.

10. The apparatus of claim 9, wherein determine the phase of the carrier signal based on the ratio of the difference to the additional difference comprises:
    determine the phase of the carrier signal as an arctangent of the difference to the additional difference.

11. The apparatus of claim 1, wherein the plurality of pixel groups included in the detector are arranged in a repeating pattern.

12. The apparatus of claim 11, wherein the repeating pattern comprises a 2 by 2 grid, where each pixel group in the 2 by 2 grid captures light that has a 90-degree phase shift relative to light captured by another pixel group in the 2 by 2 grid.

13. The apparatus of claim 1, wherein the carrier signal comprises a sine wave.

14. The apparatus of claim 1, wherein the carrier signal comprises a square wave.

15. A method comprising:
    modulating a pattern of structured light by a carrier signal so an intensity of the pattern of structured light varies over time based on the carrier signal;
    emitting the modulated pattern of structured light into a local area;
    capturing a portion of the modulated pattern of structured light using a detector comprising a plurality of pixel groups, each pixel group configured to capture light at different times than other pixel groups;
    determining a phase of the carrier signal based on intensities of light received by different pixel groups in the detector;

determining a time for the portion of the modulated pattern of structured light to be reflected from one or more objects in the local area and captured by the detector based on the determined phase of the carrier signal; and determining a distance from the detector to the one or more objects in the local area from the determined time.

16. The method of claim 15, further comprising generating a frame including the pattern of structured light from the light captured by each pixel group in the detector at the different times.

17. The method of claim 16, wherein capturing the portion of the modulated pattern of structured light using the detector comprising the plurality of pixel groups comprises:

capturing light using different pixel groups at the different times.

18. The method of claim 17, wherein capturing light using different pixel groups at the different times comprises:

capturing light using different pixel groups so light captured by a pixel group has a specific phase shift relative to light captured by other pixel groups adjacent to the pixel group.

19. The method of claim 18, wherein the specific phase shift comprises a ninety degree phase shift.

20. The method of claim 19, wherein determining the phase of the carrier signal based on intensities of light received by different pixel groups in the detector comprises:

determining a difference between intensities of light captured by the pixel group in the detector and by another pixel group in the detector adjacent to the pixel group;

determining an additional difference between intensities of light captured by an alternative pixel group in the detector and a further pixel group in the detector adjacent to the alternative pixel group, the alternative pixel group and the further pixel group adjacent to the pixel group; and determining the phase of the carrier signal based on a ratio of the difference to the additional difference.

* * * * *